Feb. 24, 1948.  F. E. ELLWOOD  2,436,507
HAND SHIELD FOR COOKING UTENSILS
Filed March 25, 1946   2 Sheets-Sheet 1

INVENTOR:
F. E. Ellwood,
BY
ATTORNEY.

Feb. 24, 1948.　　　F. E. ELLWOOD　　　2,436,507
HAND SHIELD FOR COOKING UTENSILS
Filed March 25, 1946　　　2 Sheets-Sheet 2
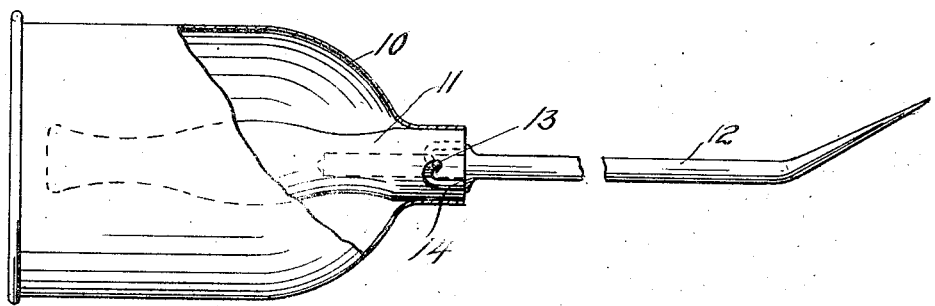
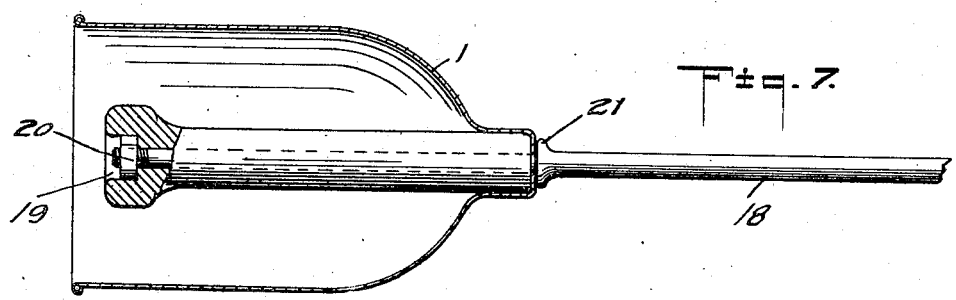
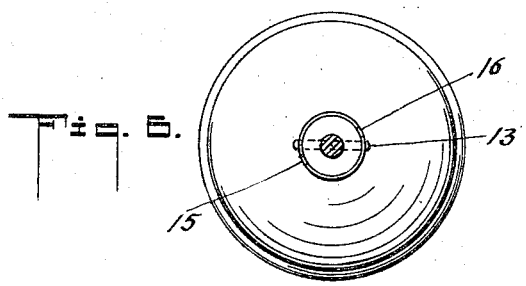
INVENTOR:
F. E. Ellwood
BY
ATTORNEY.

Patented Feb. 24, 1948

2,436,507

UNITED STATES PATENT OFFICE 2,436,507

HAND SHIELD FOR COOKING UTENSILS

Frances E. Ellwood, Manhattan Beach, Calif.

Application March 25, 1946, Serial No. 656,963

2 Claims. (Cl. 2—17)

This invention relates to cooking utensils and has particular reference to a device for protecting the hand holding and operating such utensils close to the fire that is necessary for cooking operations.

In warmer climates, outdoor cooking is quite common and special utensils have been developed which are particularly adapted for cooking purposes over open fires. Such utensils are generally provided with very long handles in order to maintain the hand far enough removed from the heat of the fire to avoid any danger of injury to the skin. It is found, however, that in so constructing the utensil it often becomes difficult, if not impossible, to perform the sometimes rather delicate cooking operations, with the result that often the cooked food is spoiled, or, at least, not of the desired quality or appearance. In view of the foregoing, it is the object of the present invention to provide a cooking utensil of the character referred to which is so constructed and shaped that it may be conveniently and efficiently employed in the open fire cooking operation and which is provided with a protective covering for the hand which operates the utensil. A further object is to provide a hand-protecting device which may be interchangeably used on variously shaped cooking utensils.

These and further objects of the invention will become apparent upon perusal of the following detailed description and by referring to the accompanying drawings, of which:

Fig. 5 illustrates a modified method of assembling the hand shield of the invention on a cooking utensil;

Fig. 6 is a front view of the device of Fig. 5; and

Fig. 7 illustrates a different method of assembling the shield on the cooking utensil.

Figure 1:
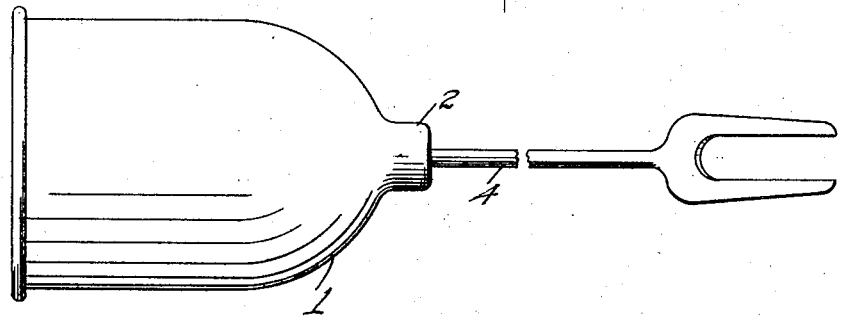
Fig. 1 is a general view of a device embodying the invention.
Figure 2:
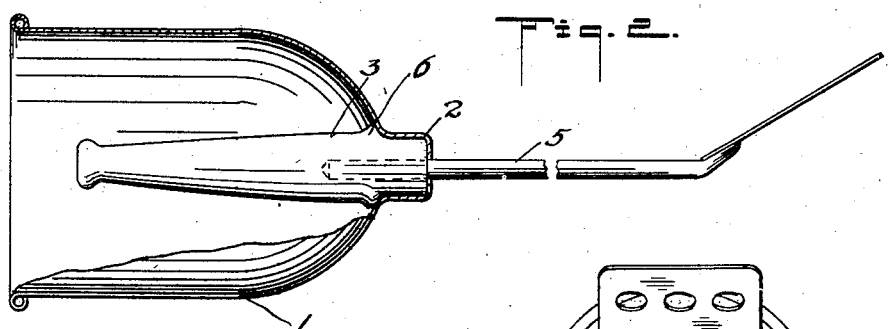
Fig. 2 is a side view partly in section showing a preferred method of adapting the hand shield of the invention to a cooking utensil.
Figure 3:
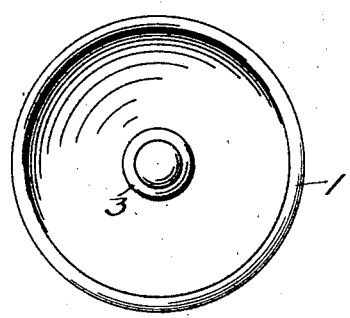
Fig. 3 is a rear view of the device.
Figure 4:
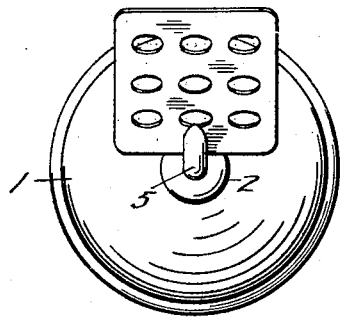
Fig. 4 is a front view of the device illustrated in Fig. 2.

Referring in the first instance to Figs. 1 to 4, the numeral 1 designates the hand shield of the invention which is formed into a cup shape. The bottom of the shield is extended to form a cylindrical recess 2, within which a handle 3 is tightly fitted, whereupon the shank 4 of the utensil of Fig. 1 or Fig. 2 is driven into the end of the handle. It is noticed that the handle is made with an enlarged shoulder portion 6 which comes to a stop against the inner surface of the shield when the parts are assembled as above described, thereby to maintain the parts firmly in assembled position. It is noted that the utensil of Fig. 1 represents a fork and the utensil of Fig. 2 a spatula, and this is done merely to indicate that the hand shield of the invention may be employed on various kinds of utensils used in outdoor open fire cooking.

The device of Fig. 5 is generally similar to the foregoing, the only difference being that the shield 10 is more readily removable from the utensil. The latter comprises a handle 11 into which is driven the shank 12 of any desired utensil, whereupon a pin 13 is driven transversely through the handle and the end of the shank seated therein. Diametrically opposite slots 15, 16 are sunk axially into the end of the shield and are made with lateral extensions substantially as indicated in Fig. 5, in which the projecting ends of the pin 13 come to rest when the shield is applied to the handle. When it is desired to remove the utensil from the shield, it is merely required to rotate the former on the latter until the pin 13 again comes into alignment with the axial portion of the slots 15, 16, whereupon the shield may be withdrawn from the utensil and another mounted therein in place thereof.

The structure of Fig. 7 is added merely to illustrate a different method of assembling the handle on the utensil. In this case the shield takes substantially the same shape as that of Fig. 1, but the utensil is made in separable parts, including a handle 17 which is axially perforated to receive the rear end of the shank 18. The rear end of the handle perforation is enlarged to provide a recess 19, of a size to receive a threaded nut 20, and the latter engages screw threads at the end of the shank to draw the latter into the handle until the shoulder portion 21 of the shank comes into contact with the front end of the shield, thereby to clamp the utensil firmly in position within the shield.

I claim:

1. In a hand shield for a cooking utensil having a shank, a handle attachable to said shank in axial continuation thereof, the inner end of said handle terminating in a cylindrical portion behind which is an annular shoulder, and a cup-shaped frame having a perforation in the bottom thereof for passage of the shank of the utensil therethrough and made with a cylindrical recess at the bottom thereof for fittingly receiving the cylindrical end portion of the said shoulder abutting the inner frame surface at the entrance to said recess.

2. In a device of the character described, a cup-shaped hand shield having in the bottom thereof a cylindrical recess and a perforation through the center of said recess the entrance to which is well rounded, a cooking utensil having a cylindrical shank insertable into the shield through said perforation, and a substantially cylindrical handle one end of which is shaped fittingly to seat in the recess of said shield and having an annular rounded shoulder for contact with the rounded entrance to the recess when the handle is driven thereinto, said handle being recessed to receive the inner end of said shank.

FRANCES E. ELLWOOD.

REFERENCES CITED

The following references are of record in the file of this patent:

UNITED STATES PATENTS

| Number | Name | Date |
|---|---|---|
| 830,016 | Sims | Sept. 4, 1906 |
| 1,096,204 | Taggart | May 12, 1914 |
| 1,330,406 | Stricklin | Feb. 10, 1920 |
| 1,747,097 | Young | Feb. 11, 1930 |
| 2,352,010 | Robbins | June 20, 1944 |